United States Patent [19]

Lane

[11] Patent Number: 4,538,904

[45] Date of Patent: Sep. 3, 1985

[54] MULTIPLE MAGNIFICATION MODE COPYING APPARATUS

[75] Inventor: John N. Lane, Leighton Buzzard, England

[73] Assignee: Xerox Corporation, Stamford, Conn.

[21] Appl. No.: 534,048

[22] Filed: Sep. 20, 1983

[30] Foreign Application Priority Data

| | | | |
|---|---|---|---|
| Sep. 21, 1982 | [GB] | United Kingdom | 8226842 |
| Sep. 21, 1982 | [GB] | United Kingdom | 8226843 |

[51] Int. Cl.[3] .................. G03B 27/34; G03G 15/00

[52] U.S. Cl. .................. 355/57; 355/8; 355/11

[58] Field of Search .................. 355/55, 56, 57, 8, 11

[56] References Cited

U.S. PATENT DOCUMENTS

| | | | |
|---|---|---|---|
| 2,059,083 | 10/1936 | Browne | 179/100.3 |
| 2,073,899 | 3/1937 | Luther | 4/288 |
| 3,614,222 | 10/1971 | Post et al. | 355/8 |
| 3,884,574 | 5/1975 | Doi et al. | 355/55 |
| 3,897,148 | 7/1975 | Ritchie et al. | 355/57 |
| 4,168,905 | 9/1979 | Kitajima | 355/60 |
| 4,441,805 | 4/1984 | Smith | 355/55 |

FOREIGN PATENT DOCUMENTS 2047742A 3/1981 United Kingdom .

*Primary Examiner*—Monroe H. Hayes

[57] ABSTRACT

A multiple magnification mode copying apparatus includes a full and half rate scanning mirror system and a lens for forming an image of an object to be copied. The lens may be shifted along its optical axis to any one of a plurality of predetermined positions to change the magnification mode of the apparatus, and at the same time shifted transversely of the optical axis by the appropriate amount for each of said predetermined positions in order to maintain one edge of the image adjacent one edge of the copy regardless of the magnification mode. The half rate mirror system is also shifted so as to achieve the required conjugate lengths. The means for shifting the lens comprises a first cable and pulley system, and the means for shifting the half rate mirror system comprises a second cable and pulley system, the two cable and pulley systems being driven by a single driving means. The single driving means drives the cable of the first cable and pulley system, and the cable of the first cable and pulley system drives an interconnecting shaft. The cable of the second cable and pulley system is driven, for shifting the half rate mirror system, by the interconnecting shaft.

7 Claims, 8 Drawing Figures

MULTIPLE MAGNIFICATION MODE COPYING APPARATUS

BACKGROUND OF THE INVENTION

This invention relates to a multiple magnification mode copying apparatus, and particularly to such an apparatus which includes a full and half rate scanning mirror system, a lens for forming an image of an object to be copied, and means for shifting the lens along its optical axis to any one of a plurality of predetermined positions to change the magnification mode of the apparatus.

Typical of such an apparatus is a xerographic copying machine using a full and half rate scanning mirror system. In such a machine, if a standard lens is used, as well as shifting the lens along its optical axis, to change the magnification mode, the half rate mirror system is also moved to maintain the correct conjugate distances. The various necessary movements of the lens and half rate mirror system can be carried out in a relatively straightforward manner if the datum line for documents to be copied, and the resultant copies, is taken to be the centre line of the system. In other words, documents and copies of different sizes need to be aligned so as to lie symetrically on either side of a centre line. This is known as a centre registration system. For the machine operator, however, the most convenient registration system is the edge registration system, where all documents and copies are made with one edge as the datum line. This gives rise to the need to move the lens transversely of the optical axis by the appropriate amount for each of the magnification modes. Furthermore, the relationships between the various necessary movements are complex, and if more than two magnification modes are required, the mechanisms for achieving the required positions of the lens and the half rate mirror system tend to be rather complicated.

If a zoom lens is used in a multiple magnification mode machine, although there is no need to shift the half rate mirror system for the different magnification modes, the relative positions of the lens elements must be changed. As with a copying apparatus using a standard lens, the zoom lens must also be shifted transversely of its optical axis in an edge registration system.

Examples of variable magnification copying machines using standard lens systems of the centre registration type, in which the lens and the half rate mirrors are shifted to vary the magnification, are described in U.K. patent specification No. 2074742A and in U.S. Pat. No. 4,168,905. Examples of variable magnification copying machines using zoom lens systems, and of the edge registration type in which the half rate mirrors are not shifted, but in which the lens is moved transversely of its optical access, are described in U.S. Pat. Nos. 2,059,083A and 2,073,899A.

An example of a dual magnification mode copying machine using a standard lens system, which is of the edge registration type, in which the lens is moved both along and transversely of its optical access, and in which the half rate mirror is shifted, is described in U.S. Pat. No. 3,614,222.

SUMMARY OF THE INVENTION

It is an object of the present invention to provide a simplified multiple magnification mode copying apparatus which uses a standard lens, a full and half rate scanning system, and edge registration.

It is a further object of the invention to provide such an apparatus in which a single driving means is used to change magnification modes by causing movements of the lens both along and transversely of its optical axis as well as movement of the half rate mirror system.

Another object of the invention is to provide such an apparatus in which the means to shift the lens and the half rate mirror system comprise simple, inexpensive, and reliable cable and pulley systems.

According to the present invention, there is provided a multiple magnification mode copying apparatus including a platen upon which an object to be copied is placed, a full and half rate scanning mirror arrangement for scanning the platen, a lens for forming an image of said object, means for shifting the lens along its optical axis to any one of a plurality of predetermined positions to change the magnification mode of the apparatus, means for simultaneously shifting the lens transversely of the optical axis by the appropriate amount for each of said predetermined positions in order to maintain one edge of the image adjacent one edge of the copy regardless of the magnification mode, and means for simultaneously shifting the half rate mirror system so as to achieve the required conjugate lengths, wherein the means for shifting the lens comprises a first cable and pulley system, and the means for shifting the half rate mirror system comprises a second cable and pulley system, the two cable and pulley systems being arranged to be driven by a single driving means.

The foregoing and other objects, features and advantages of the invention will be apparent from the following more particular description of the preferred embodiments of the invention, as illustrated in the accompanying drawings.

DESCRIPTION OF THE PREFERRED EMBODIMENTS

Figure 1:
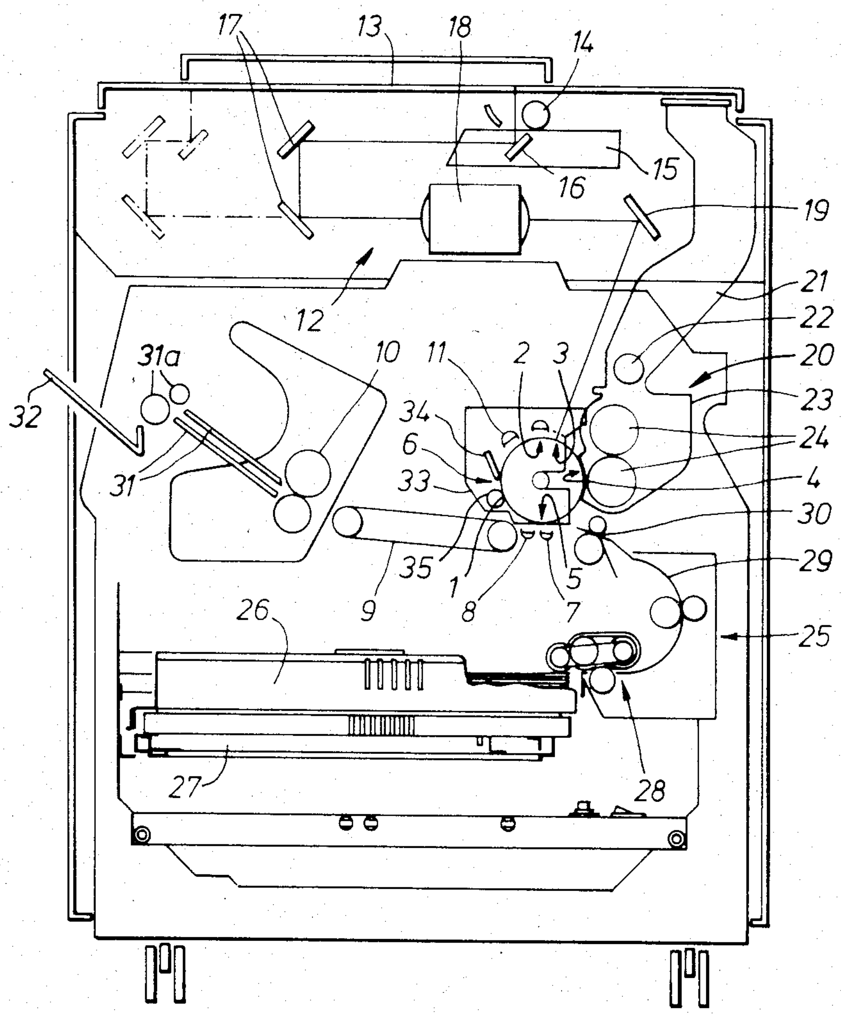
FIG. 1 is a diagrammatic cross-sectional view of a xerographic copying machine incorporating the invention.

Referring first to FIG. 1 there is shown a xerographic copying machine incorporating the present invention. The machine includes a photoreceptor drum 1 mounted for rotation (in the clockwise direction as seen in FIG. 1) to carry the photoconductive imaging surface of the drum sequentially through a series of xerographic processing stations: a charging station 2, an imaging station 3, a development station 4, a transfer station 5, and a cleaning station 6.

The charging station 2 comprises a corotron which deposits a uniform electrostatic charge on the photoreceptor. A document to be reproduced is positioned on a platen 13 and scanned by means of a moving optical scanning system to produce a flowing light image on the drum at 3. The optical image selectively discharges the photoconductor in image configuration, whereby an electrostatic latent image of the object is laid down on the drum surface. At the development station 4, the electrostatic latent image is developed into visible form by bringing into contact with it toner particles which deposit on the charged areas of the photoreceptor. Cut sheets of paper are moved into the transfer station 5 in synchronous relation with the image on the drum surface and the developed image is transferred to a copy sheet at the transfer station 5, where a transfer corotron 7 provides an electric field to assist in the transfer of the toner particles thereto. The copy sheet is then stripped from the drum 1, the detachment being assisted by the electric field provided by an A.C. de-tack corotron 8. The copy sheet carrying the developed image is then carried by a transport belt system 9 to a fusing station 10.

After transfer of the developed image from the drum, some toner particles usually remain on the drum, and these are removed at the cleaning station 6. After cleaning, any electrostatic charges remaining on the drum are removed by an A.C. erase corotron 11. The photoreceptor is then ready to be charged again by the charging corotron 2, as the first step in the next copy cycle.

The optical image at imaging station 3 is formed by optical system 12. A document (not shown) to be copied is placed on platen 13, and is illuminated by a lamp 14 that is mounted on a scanning carriage 15 which also carries a mirror 16. Mirror 16 is the full-rate scanning mirror of a full and half-rate scanning system. The full-rate mirror 16 reflects an image of a strip of the document to be copied onto the half-rate scanning mirror 17. The image is focussed by a lens 18 onto the drum 1, being deflected by a fixed mirror 19. In operation, the full-rate mirror 16 and lamp 14 are moved across the machine at a constant speed, while at the same time the half-rate mirrors 17 are moved in the same direction at half that speed. At the end of a scan, the mirrors are in the position shown in a broken outline at the left hand side of FIG. 1. These movements of the mirrors maintain a constant optical path length, so as to maintain the image on the drum in sharp focus throughout the scan.

At the development station 4, a magnetic brush developer system 20 develops the electrostatic latent image. Toner is dispensed from a hopper 21 by means of a rotating foam roll dispenser 22, into developer housing 23. Housing 23 contains a two-component developer mixture comprising a magnetically attractable carrier and the toner, which is brought into developing engagement with drum 1 by a two-roller magnetic brush developing arrangement 24.

The developed image is transferred, at transfer station 5, from the drum to a sheet of copy paper (not shown) which is delivered into contact with the drum by means of a paper supply system 25. Paper copy sheets are stored in two paper trays, an upper, main tray 26 and a lower, auxiliary tray 27. The top sheet of paper in either one of the trays is brought, as required, into feeding engagement with a common, fixed position, sheet separator/feeder 28. Sheet feeder 28 feeds sheets around curved guide 29 for registration at a registration point 30. Once registered, the sheet is fed into contact with the drum in synchronous relation to the image so as to receive the image at transfer station 5.

The copy sheet carrying the transferred image is transported, by means of vacuum transport belt 9, to fuser 10, which is a heated roll fuser. The image is fixed to the copy sheet by the heat and pressure in the nip between the two rolls of the fuser. The final copy is fed by the fuser rolls along output guides 31 into catch tray 32, which is suitably an offsetting catch tray, via output nip rolls 31*a*.

After transfer of the developed image from the drum to the copy sheet, the drum surface is cleaned at cleaning station 6. At the cleaning station, a housing 33 forms with the drum 1 an enclosed cavity, within which is mounted a doctor blade 34. Doctor blade 34 scrapes residual toner particles off the drum, and the scraped-off particles then fall into the bottom of the housing, from where they are removed by an auger 35.

Figure 2:
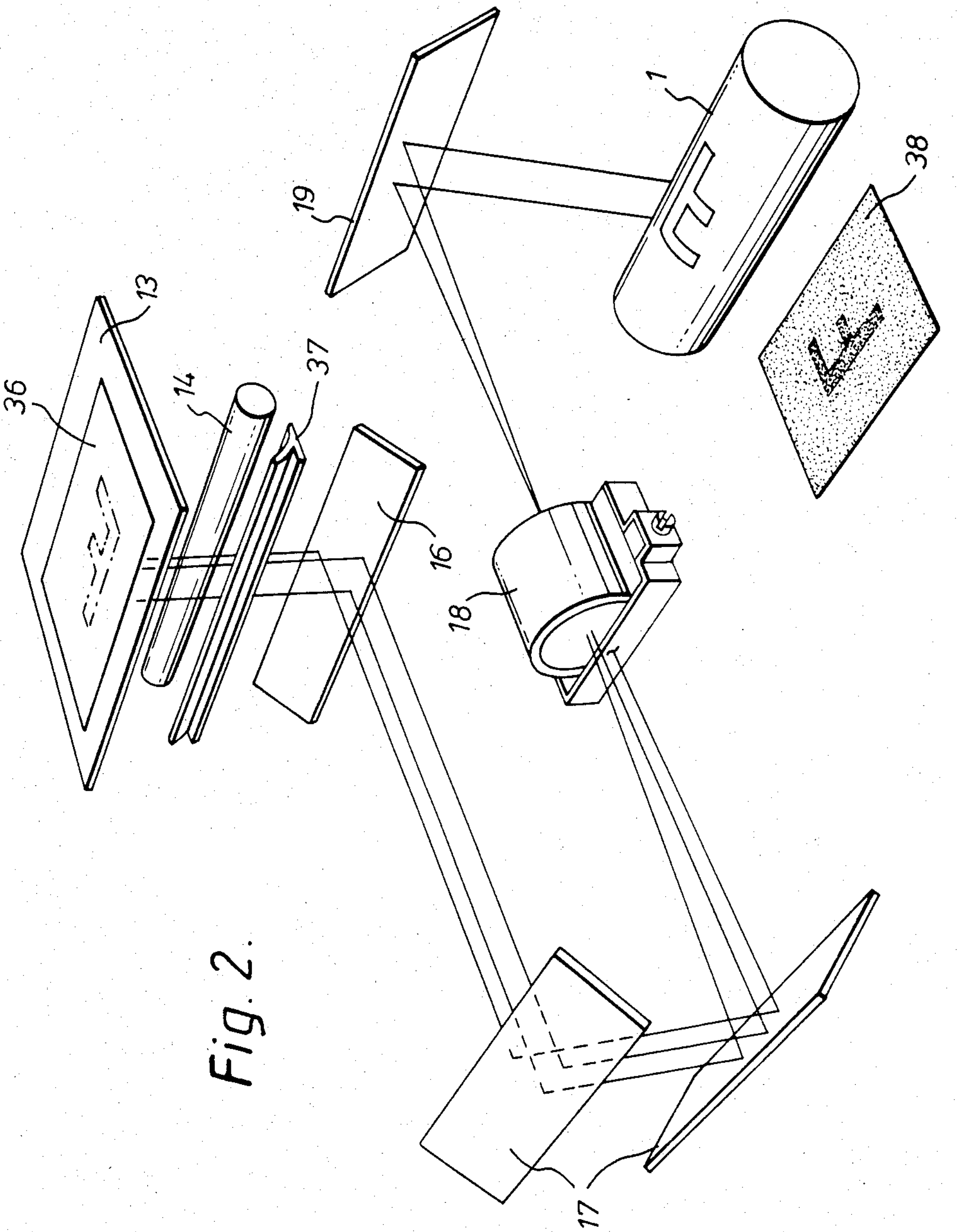
FIG. 2 is a diagrammatic perspective view of the basic elements of the optical system of the machine of FIG. 1.

Referring now to FIG. 2, the essential elements of the optical system are shown, with reference numerals corresponding with those used in FIG. 1. In addition, FIG. 2 shows a document 36 on the platen 13, an object exposure slit and reflector 37, and a copy sheet 38 carrying a developed image of the information on the document 36.

SCANNING OPTICS

Figure 3:
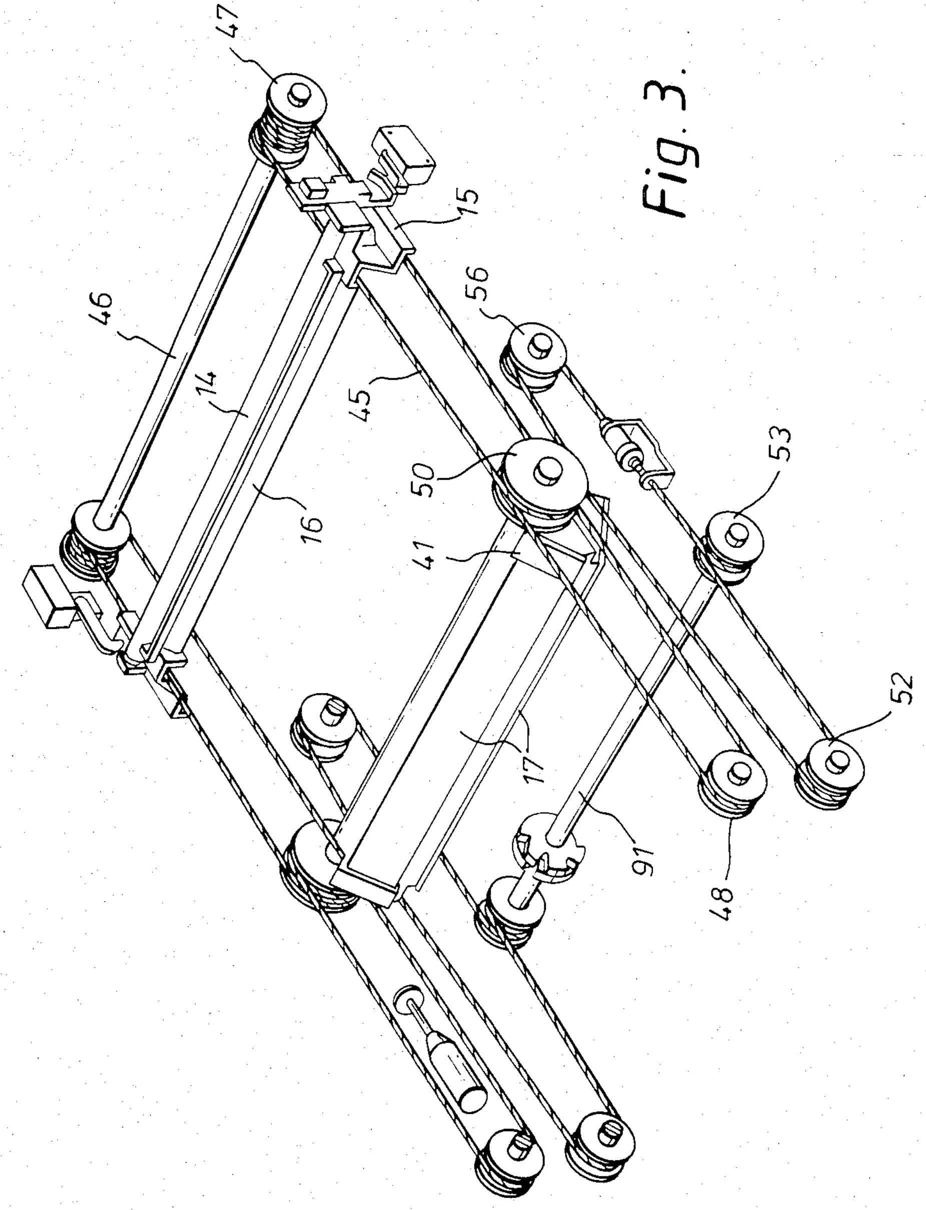
FIG. 3 is a perspective view showing the scanning mirror drive system.

The full and half-rate scanning mirrors are caused to scan by means of the scanning arrangement illustrated in FIG. 3.

The following description refers only to the pulleys and cables which operate the system at the front of the machine. It is to be understood that corresponding pulleys and cables are present at the rear of the machine in the same configuration.

For any given copy, the platen, the lens, and the mirror 19 (FIGS. 1 and 2) are stationary, while the full-rate mirror 16 is moved across the platen 1 by the full-rate carriage 15 which also carries the lamp 14 and reflector 37. At the same time, the half-rate mirrors 17 are moved by the half-rate carriage 41 in the same direction as the full-rate mirror 16, but at half the speed.

A cable 45 has one end fixed to the full-rate carriage 15, and then goes to the right and passes clockwise around a drive capstan 47. The cable 45 is wrapped at least twice around the capstan 47, which is mounted on capstan shaft 46 driven by a scanning motor (not shown), and then goes to the left to pass clockwise around a fixed axis pulley 48. From the top of pulley 48, the cable goes to the right and passes clockwise around a first part of a double pulley 50, which is secured for rotation on the half-rate carriage 41. The cable next passes to the left and goes anticlockwise around fixed axis pulley 52. The lowermost run of cable 45 goes to the right and is wound at least twice clockwise around a capstan 53 which may be driven in either direction by a reduction mode drive motor 54, by way of reduction drive cable 81 (FIG. 6) and reduction drive shaft 91. From the capstan 53, the cable 45 goes to the right and passes anticlockwise round a fixed axis pulley 56, from which it goes back to the left and passes clockwise around the second part of the double pulley 50. From the top of the pulley 50, the cable goes to the right and its other end is secured to the full-rate carriage 15.

In order to carry out a scanning operation, the scanning motor is energised so as to rotate the capstan shaft 46 and hence capstan 47, thereby driving the full and half-rate mirror carriages 15 and 41 to the right, the cable and pulley system causing the half-rate carriage 41 to travel at half the speed of the full-rate carriage 15 and in the same direction. The drive from the scanning motor is reversed when it is desired to return the full and half-rate carriages to their original positions.

During the scanning motion, the lower loop of the cable 45, that is to say the part which extends around pulley 52, capstan 53 and pulley 56, remains stationary, since equal amounts of cord wind onto and off the double pulley 20.

The full and half-rate carriages 15 and 41 are normally held in a "park" position at the right-hand side of the machine. This position represents the end of a scanning operation, so the carriages must be moved back to the left, in a "re-scan" movement, in readiness for a normal left-to-right scanning motion. A solenoid-operated park latch is used to latch the full-rate carriage 15 in the park position.

At the start of a scanning cycle, the exposure lamp 14 (FIGS. 1 and 2) is illuminated, and the park latch solenoid operated to release the full-rate carriage. A clutch is then operated to apply drive from the scanning motor to the drive capstan 47 in the re-scan direction. The way in which this is done will be described with reference to FIG. 4, which is a diagrammatic representation of the gearing arrangement of the scanning system.

Figure 4:
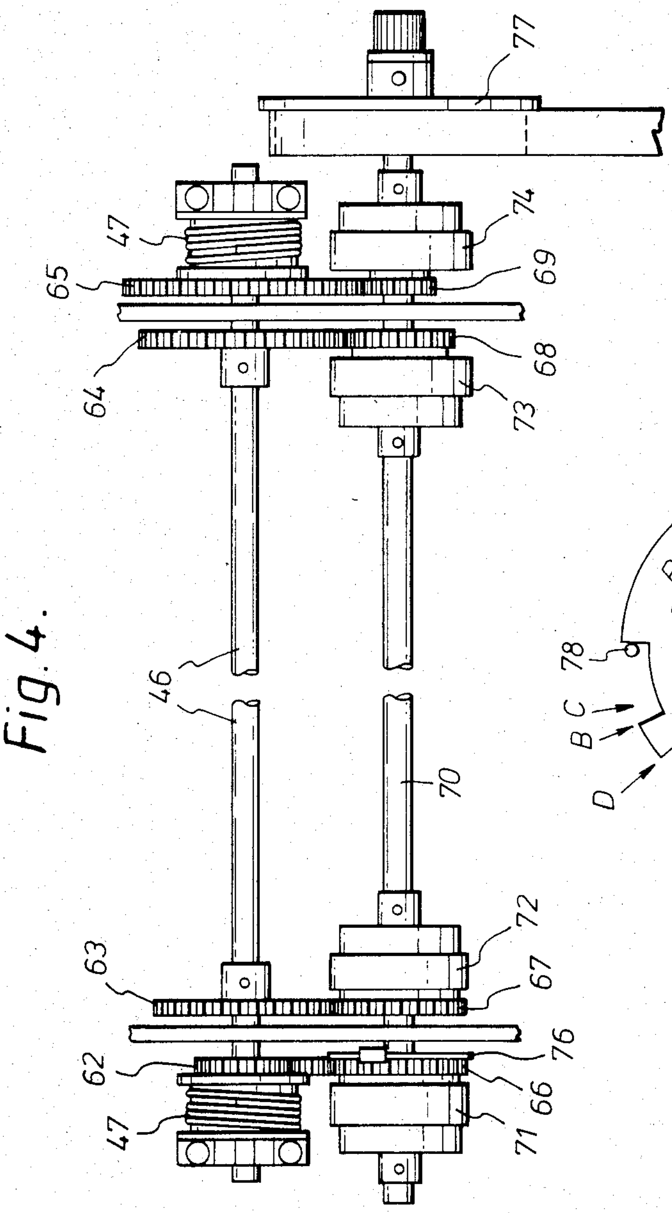
FIG. 4 is an end view of the gearing arrangement of the scanning system.

Referring to FIG. 4, the capstan shaft 46 for capstan 47 carries four gear wheels 62, 63, 64, 65 which are fixed to and driven by shaft 46. Four meshing gears 66, 67, 68 69 are carried by a drive shaft 70 which is parallel with the shaft 46. The gears 66, 68, 68, 69 are mounted for rotation about the shaft 70, and any one of them may be locked for rotation with the shaft 70 by means of associated electromagnetic clutches 71, 72, 73 and 74 respectively. Three of the gear sets (63, 67; 64, 68; 65, 69) are for the normal scanning of the system, one set for each magnification mode. The fourth set (62, 66) includes an interposed third gear 75 which is an idler gear, to reverse the direction of rotation of the capstan 47, to provide the drive for the re-scan motion.

Figure 5:
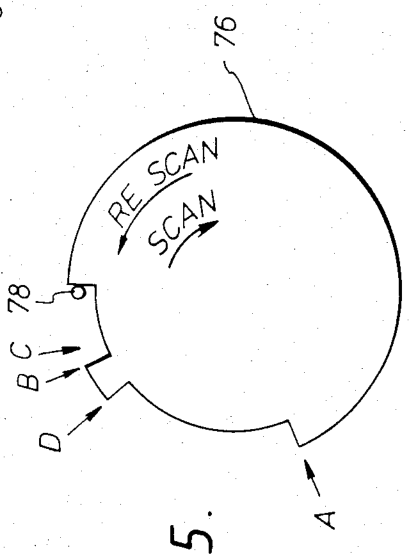
FIG. 5 illustrates a timing disc for the scanning system.

The positions of the full and half-rate carriages are controlled by an optical timing sensor, which consists of a light source, an optical sensor 78 in the form of a phototransistor, and a timing disc 76 (FIG. 5). The timing disc 76 is mounted for rotation about drive shaft 70, but is turned by capstan shaft 46. One complete turn of the timing disc represents the movement of the full-rate carriage 15 from one side of the machine to the other. The timing disc is notched as shown, and appropriate signals are generated by the sensor 78 whenever it detects light. When the optical system is in the "parked" position at the right hand side of the machine, following a scan, the disc 76 is in the position shown in FIG. 5. During re-scanning, the disc turns anticlockwise (as viewed in FIG. 5) until notch edge A on the disc passes the sensor 78. This produces a signal which tells the machine logic circuitry to de-energise the re-scan clutch 71. Since drive shaft 70 makes no more than a complete revolution during a scanning cycle, this ensures that optical sensor receives no more than one signal for each unique notch edge of the timing disc during a complete scan or re-scan cycle.

Drive shaft 70 carries a drive pulley 77 for rotation by the scanning motor. After the re-scan clutch 71 is de-energised, the carriage drive system will not stop immediately because of inertia and the clutch disengagement time. Motion is stopped by a gas damper device, and the appropriate one of the "scan" clutches 72, 73, 74 is energised by the machine logic receiving a signal as the optical sensor detects notch edge B on the timing disc 76. The carriage is finally stopped when position C on the timing disc is adjacent the optical sensor.

The carriages now start to scan. As they move forward, the optical sensor detects notch edge D on the timing disc (now rotating clockwise, as viewed in FIG. 5) which primes the logic circuitry to release the copy paper registration edge, thus ensuring correct lead edge synchronisation of the copy paper with the image on the photoreceptor.

As scanning is taking place, the length of copy paper being fed from the paper tray is monitored by a paper path switch, which primes the logic to de-energise the scan clutch 72, 73 or 74 when the full-rate carriage has scanned a distance equal to the length of copy paper fed (provided one or more further copies are required). After a short delay (50 m sec), the re-scan clutch 72 is energised, thus driving both carriages back to the lef-hand side of the platen and allowing the whole scan cycle to be repeated.

If only one copy is required, or reduction copying has been selected, the machine logic will ignore the paper size signal from the paper path switch and will allow the carriages to continue travelling towards end of scan. A "home" microswitch is eventually actuated by the full-rate carriage resulting in de-energisation of the scan clutch approximately 10 mm before the full-rate carriage reaches the right-hand park position. However, the system inertia and clutch disengagement time are sufficient to cause the full-rate carriage to run on and allow the park latch to automatically lock the full-rate carriage in the correct park position.

A park position on the right-hand side of the machine (following "scan", but before "re-scan") has been selected to facilitate the use of the machine in conjunction with document handlers. When a document handler is used, the time spent in copying the first document is reduced by employing the movement of the document over the platen to produce the required scanning. Under these conditions, the optics remain stationary. As soon as the first document has been copied, however, the optics return to the scanning mode for subsequent documents.

REDUCTION OPTICS

The scanning system has been described so far without reference to the changing of the magnification mode. In order to change the magnification of the system, for example to change from full-sized copying to copying in a reduction mode, the lens 18 is shifted along the optical path through the system by means of reduction mode drive motor 54 acting through reduction drive cable 81 and reduction drive shaft 91. Movement of the lens along its optical axis requires appropriate changes in the conjugate distances. In the present arrangement, the necessary adjustment to the conjugate distances is made by moving the position of the half-rate carriage 41. This is done by moving the cable 45 around the lower loop i.e. around pulley 52, capstan 53 and pulley 56. In order to make this adjustment, motor 54 is energised so as to rotate capstan 53. This changes the position of the half-rate carriage 41, without affecting the position of the full-rate carriage 15. The amount of angular movement of capstan 53 is, of course, selected to produce the desired movement of the half-rate carriage 41, bearing in mind the gearing provided by the various pulleys.

The lens 18 is moveable from a standard position in which full-sized copies of an original are made, to either of two positions giving reduction mode copies. This introduces a complication in that the relationship between the lens position and the half-rate carriage position is not a linear one. In moving from full-sized copying to the first reduction mode, the lens has to be moved several times further than the half-rate carriage. In moving from the first reduction mode to the second reduction mode, somewhat similar amounts of movement have to be made by both the lens and the half-rate carriage.

Furthermore, in a copying machine which uses edge registration, the lens must be shifted transversely of its optical axis so as to align the edge of reduced size images with the edge of the photoreceptor (and hence the copies) Thus the lens has to make a rather complicated motion as it is shifted from the standard position through the first reduction mode position to the second reduction mode position. The amount of side-shifting required is also in nonlinear relationship with the axial distance moved by the lens.

Figure 6:
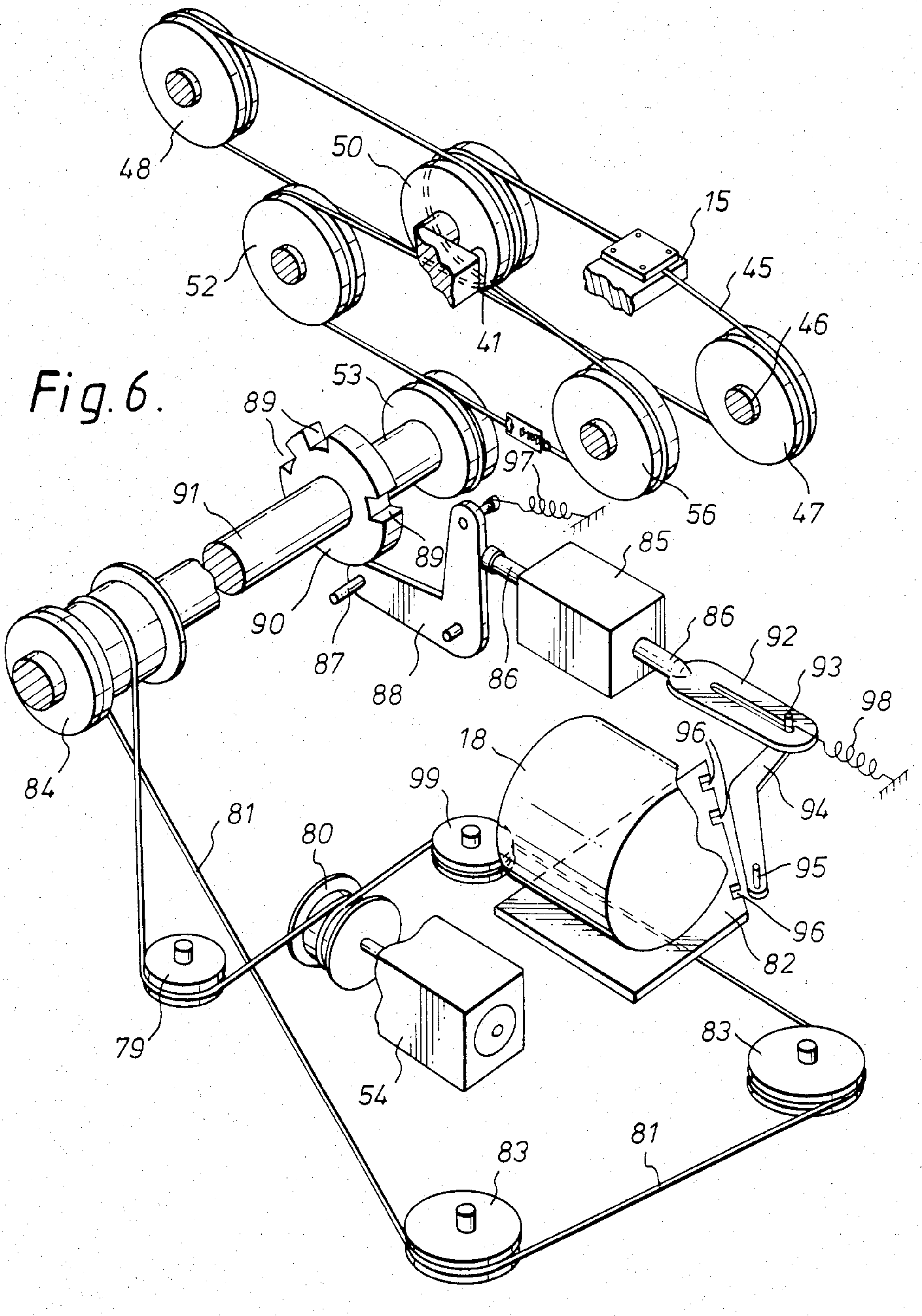
FIG. 6 is a diagrammatic perspective view of the lens shifting arrangement.
Figure 7:
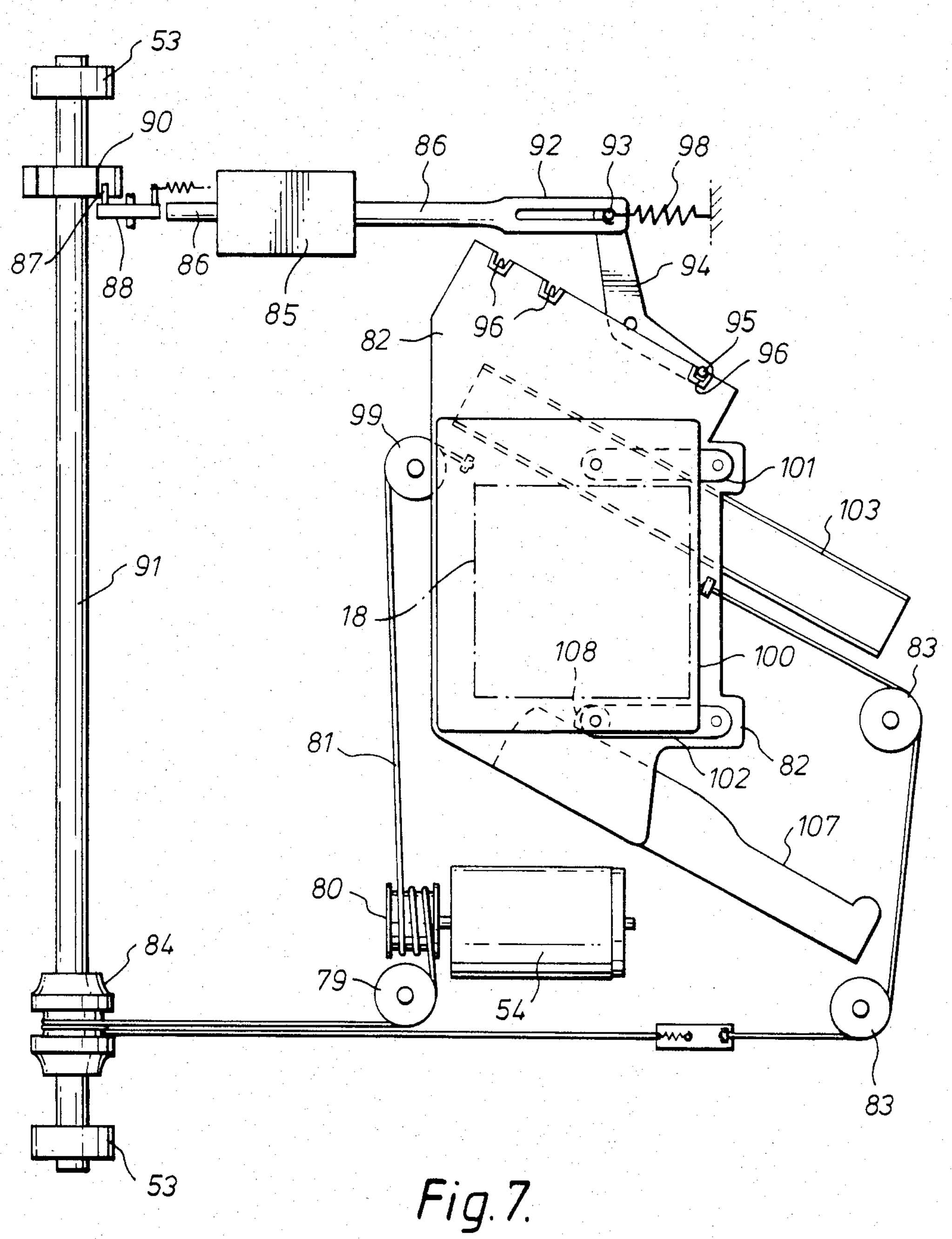
FIG. 7 is a diagrammatic plan view showing in more detail the arrangement for transverse movement of the lens.

The way in which the lens and the half-rate carriage are moved to change magnification mode will now be described in more detail with reference to FIGS. 6 and 7. FIG. 6 is a diagrammatic perspective view highlighting the arrangement for driving the lens 18 along the optical axis at the same time as the position of the half-rate carriage 41 is adjusted. The viewpoint is from the rear of the machine, so that the scanning cable and pulleys shown are those described as being at the front of the machine in FIG. 3.

The three movements necessary to change magnification mode, i.e. shift of position of the half-rate carriage, axial lens movement and transverse lens movement, are all carried out simultaneously. Considering first only the half-rate carriage movement and the axial component of lens movement, reference will be made to FIG. 6. Changes in magnification mode are achieved by energising motor 54. Motor 54 carries a capstan 80 which drives reduction mode drive cable 81 in either direction around a loop which starts at the lens carriage 82 of lens 18, to which the cable is fixed. From its anchor point on lens carriage 82, the cable 81 passes around two idler pulleys 83 around the capstan of a friction clutch 84, mounted on the reduction drive shaft 91, around an idler pulley 79, around the capstan 80 of motor 54, around another idler pulley 99, and back to the lens carriage 82.

As motor 54 is energised, so is a solenoid 85, causing the plunger 86 of the solenoid to move to the left as viewed in FIG. 6. The left-hand end of plunger 86 engages a cranked lever 88, and causes a pin 87 on the cranked lever to withdraw from one of the notches 89 on a locating disc 90. Disc 90 is carried by reduction drive shaft 91 on which the friction clutch 84 and the capstan 53 are mounted. As plunger 86 moves to the left, it pulls slotted arm 92 with it, the end of the slot in arm 92 engaging pin 93 and pulling it to the left. Pin 93 is mounted on a cranked lever 94 which has a pin 95 at its other end. Pin 95 is accordingly moved out of engagement with one of the notches 96 on the lens carriage 82.

Rotational movement of the capstan 80 of motor 54 accordingly causes locating disc 90 and capstan 53 on shaft 91 to rotate. Rotation of capstan 53 moves the half-rate carriage 15 towards the position for the newly-selected magnification mode, as determined by the position of the relevant notch 89 on the locating disc 90. Once movement has been initiated, the solenoid 85 is de-energised, and pin 87 drops back into the appropriate notch 89 under the action of a spring 97, thereby locating the half-rate carriage 15 and clamping the shaft 91 against rotation. Because the amount of movement of the lens 18 is not the same as that of the half-rate carriage, drive is still required for the lens. Friction clutch 84 accordingly slips, allowing lens carriage 82 to continue moving until pin 95, under the action of spring 98, engages the appropriate notch 96 on the lens carriage 82. The motor 54 is stopped in response to the pin 95 dropping into a notch 96, detected by a microswitch, or by optical means.

As already noted, the lens 18 is also required to have a component of movement transversely of the optical axis of the lens. Referring now to FIG. 7, the lens 18 is carried on a lens mount 100. Lens mount 100 is in turn mounted on lens carriage 82 by a pair of parallel links 101 and 102. The right-hand ends of links 101 and 102 (as seen in FIG. 7) are pivotally mounted on the lens carriage 82, while their left-hand ends are pivotally mounted to the underside of lens mount 100. Lens carriage 82 is mounted on a ball slide 103 for movement in a generally diagonal direction, and is moved in that direction by means of the reversible motor 54 and cable 81. The path of cable 81 is as described with reference to FIG. 6. The parts of the cable 82 between pulley 99 and lens carriage 82, and between lens carriage 82 and pulley 83, are in a direction parallel with the slide 103.

Also positioned generally parallel with slide 103 is a cam surface 107. A cam follower in the form of a roller 108 is carried on the pivot shaft at the left-hand end of link 107 and enables the lens mount 100 to move into the desired position for a given magnification mode. The lens mount 100 is spring urged relative to the lens carriage 82 (by means of a spring interconnecting them) such that roller 108 is always urged into engagement with the cam surface 107. The parallel links 101 and 102 ensure that the lens is always maintained with its optical axis parallel to a constant direction.

Yet a further complication exists in that the system must allow for adjustments to the initial settings of the various components to be made, to allow for manufacturing tolerances in the lens. In particular, the focal lengths of lenses made even to very close tolerances can vary by significant amounts. Adjustments may be made to the relative positions of the full and half-rate carriages to suit individual lenses by means of the positions of the notches 89 in the locating disc 90. This is achieved by forming the disc 90 of three separate disc elements each with one of the notches 89 in it, and with circumferentially extending slots adjacent the notch positions on the other two discs. The slots are long enough to allow for angular adjustment of each of the notch positions to accommodate the permitted tolerances in the focal length of the lens. Once the three notches have been positioned for an individual lens, the three discs are clamped and sealed together to form the locating disc 90 represented in simplied form in FIG. 6.

By way of summary of what happens when the magnification mode is changed, the following sequence of events takes place when the machine is in the full-size copying mode, and the first reduction mode is selected:

1. Magnification mode is selected.

2. Solenoid 85 is energised to release pins 87 and 97 from their respective notches 89 and 96, thereby releasing half-rate carriage 41 and lens carriage 82.
3. Reduction motor 54 is switched on, and starts driving the reduction drive shaft 91 and lens carriage 82.
4. Solenoid 55 is de-energised.
5. Locating disc 90 is latched at first reduction position. Shaft 91 stops turning and clutch 84 slips allowing continued movement of the lens carriage 82.
6. Lens carriage 82 is latched at first reduction position.
7. Motor 54 is switched off as lens locking pin 95 locates.

If the second reduction mode had been selected when the machine was in the full-size copy mode, or if the machine was already in the first reduction mode and the second reduction mode was selected, the above sequence of events is immediately followed by the following sequence:

8. Solenoid 85 is energised to release half-rate carriage 41 and lens carriage 82.
9. Reduction motor 54 is switched on.
10. Solenoid 85 is de-energised.
11. Locating disc 90 is latched at second reduction position and clutch 84 slips.
12. Lens carriage 82 is latched at second reduction position.
13. Motor 54 is switched off as lens locking pin 95 locates.

Return to the full-size copy mode or to the first reduction mode is achieved by similar sequences but with the reverse direction of rotation of motor 54.

In the absence of the making of any reduction mode copies for 50 seconds, the system automatically returns to the full-size copy mode.

THE PLATEN

The platen 13 (FIGS. 1 and 2) is of standard soda-lime glass, but has a coating on its underside of a relatively conductive material. This prevents build-up of electrostatic charge on the platen, which otherwise tends to cause stalling of documents being fed over the platen by a document handler (when such is in use).

The platen glass is supported at the front and rear only on four machined pads on the optical casting, and is retained by front and rear clamping strips. The side registration edge is a hard anodised aluminium extrusion. This component is pivotable downwards, actuated by a solenoid, to allow free passage of a document over the platen when a document handler is in use. To prevent hte formation of an image of the clearance "gap" which must be left between the platen and the registration edge, the registration edge carries on its underside a white-surfaced extension piece which extends just below the platen edge to fill the gap.

ILLUMINATION

Figure 8:
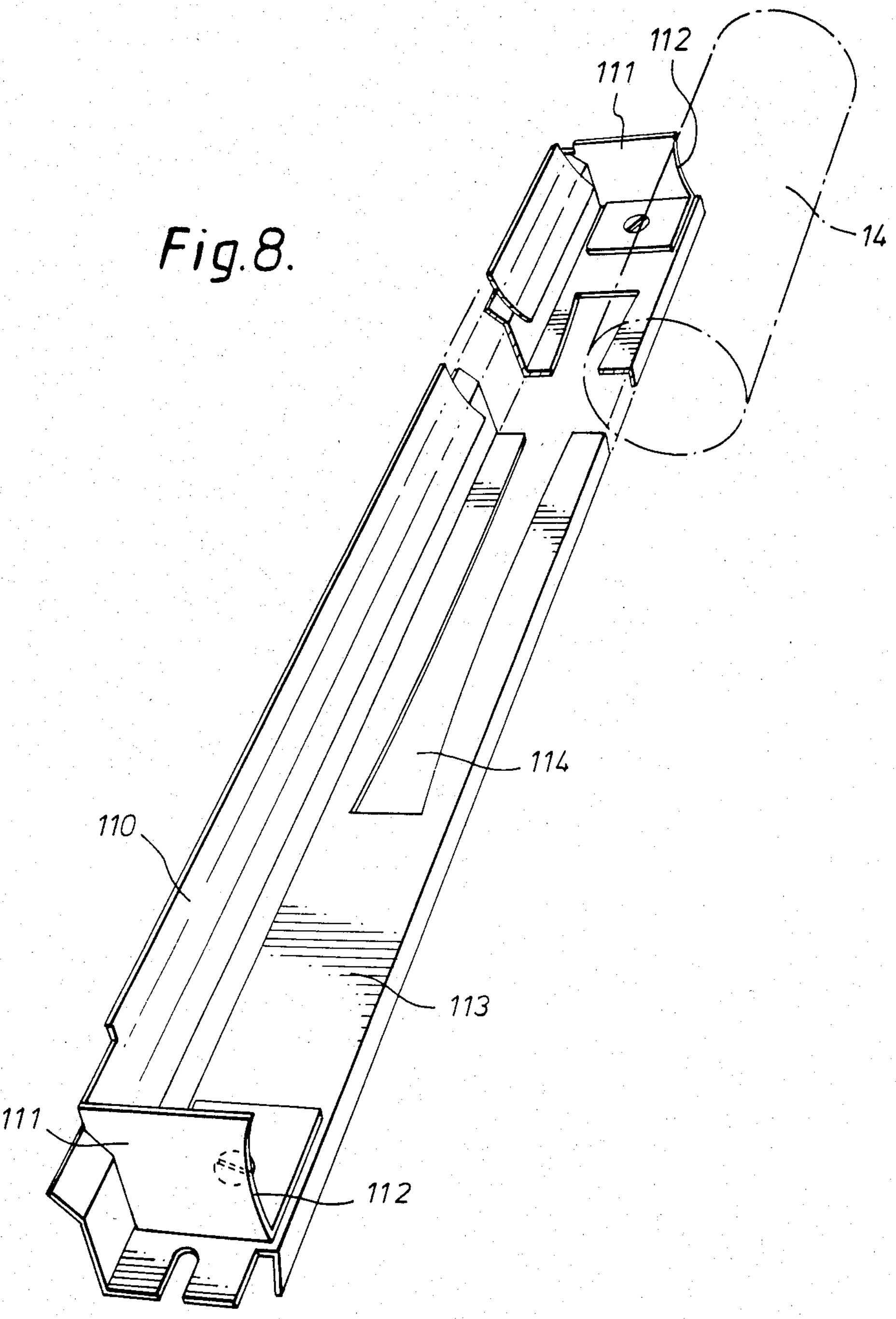
FIG. 8 is a perspective view showing part of the illumination system.

The document illumination system (FIG. 8) consists of a high output limited aperture fluorescent lamp 14 (part of which is indicated in broken outline) and a cylindrical section enhancing mirror 110. The mirror is pressed from polished aluminium sheet, and has flat end-mirrors 111 in the plane orthogonal to the lamp axis. These end-mirrors are positioned adjacent the ends of the lamp aperture, and serve two purposes. Firstly, they effectively extend the length of the useful portion of the lamp, and secondly they locate the lamp acurately, by means of their curved edges 112 against which the lamp 14 is abutted, after the mirror has been precisely aligned to the optical axis of the imaging system. The support plate 113 for the mirror 110 also contains a slit 114 which broadens towards its ends, as shown, so as to compensate for illumination fall-off towards the ends of the lamp.

I claim:

1. A document reproduction apparatus capable of operating in a plurality of magnification modes including a document support surface, a full rate scanning system and a half rate scanning system arranged to travel along a path parallel to, and below, said support surface and a lens for projecting an image of the scanned document onto a photosensitive surface, the apparatus further including an arrangement for moving the half rate mirror system and lens coincident with a change in magnification, the arrangement comprising;
   - a first cable and pulley system for moving the lens along the optical path;
   - a drive motor for driving said first cable and pulley system;
   - a second cable and pulley system for moving the half rate mirror system independent of the full rate scanning system;
   - a shaft connecting said first and second cable and pulley system; and
   - a drive motor for driving said first cable and pulley system, the motion of said first system being transferred, via said interconnecting shaft, to said second cable and pulley system to effect a simultaneous position change of lens and half rate mirror system for the particular magnification.

2. Apparatus according to claim 1, including a lens carriage supporting the lens and arranged for sliding movements along a slideway inclined to the optical axis of the lens.

3. Apparatus according to claim 1, including a camming ramp surface inclined to said optical axis, and a cam follower associated with a mount for the lens, the lens mount being pivotally mounted by parallel links on the lens carriage, to maintain the optical axis of the lens parallel with a fixed direction, and the lens mount being spring-urged relative to the lens carriage to maintain the cam follower in engagement with the ramp surface.

4. Apparatus according to claim 2 or claim 3 wherein the lens carriage has a set of latching notches, one for each of said predetermined positions, on a surface extending generally parallel with said slideway, the apparatus including removable detent means spring-urged into engagement with said notches for holding the lens in a selected position.

5. Apparatus according to claim 4 wherein said detent means is operated by a solenoid which also operates a second detent means that is arranged to cooperate with latching notches on a disc carried by said interconnecting shaft, so as to lock the shaft and locate the half rate mirror system in the desired position.

6. Apparatus according to claim 5, wherein said single driving means is arranged to drive said shaft by way of a torque limiter so that after the shaft has stopped making its angular movement by virtue of the second detent engaging one of the latching notches on said disc, the torque limiter can slip to allow the driving means to continue driving the lens carriage until the first detent means engages a latching notch on the lens carriage.

7. Apparatus according to claim 1 wherein the first cable and pulley system is arranged for driving a full-rate mirror carriage during scanning in a predetermined direction at a predetermined speed and for simultaneously driving a half-rate mirror carriage in the same direction at half said speed, as well as for shifting the half rate mirror system for the different magnification modes; the system comprising two pulleys mounted for rotation about fixed axes at opposite ends of the apparatus, one of the pulleys being a drive capstan and the other being an idler pulley; a double pulley mounted for rotation on the half-rate carriage; and a cable, a first part of the cable being fixed at one end to the full-rate carriage, extending in the predetermined direction to and passing around one of the fixed axis pulleys, extending opposite said direction to and passing around the other fixed axis pulley, extending again in said direction to and passing around one part of the double pulley, with the other end of said first part of the cable extending opposite said direction and being held in a fixed position during scanning; a second part of the cable being fixed at one end to the full-rate carriage and extending opposite said direction to and passing around the other part of the double pulley in the opposite sense to the first part of the cable, with the other end of said second part of the cable extending in said direction and being held in a fixed position during scanning; said other ends of said first and second parts of said cable being joined by a third part of the cable to form a continuous loop around at least one further pulley, and said driving means being arranged to drive said third part of the cable around the loop thereby permitting the position of the half-rate carriage to be shifted relative to the full-rate carriage.

* * * * *

UNITED STATES PATENT AND TRADEMARK OFFICE

CERTIFICATE OF CORRECTION

PATENT NO. : 4,538,904

DATED : September 3, 1985

INVENTOR(S) : John N. Lane

It is certified that error appears in the above-identified patent and that said Letters Patent are hereby corrected as shown below:

Col. 10, line 40 (Claim 3) change "1" to --2--.

Signed and Sealed this

*Eleventh* Day of *March 1986*

[SEAL]

*Attest:*

DONALD J. QUIGG

*Attesting Officer* *Commissioner of Patents and Trademarks*